United States Patent
Yusa et al.

(10) Patent No.: US 9,314,943 B2
(45) Date of Patent: Apr. 19, 2016

(54) KNEADING APPARATUS AND METHOD FOR PRODUCING THERMOPLASTIC RESIN MOLDED PRODUCT

(71) Applicant: HITACHI MAXELL, LTD., Ibaraki-shi, Osaka (JP)

(72) Inventors: Atsushi Yusa, Nagaokakyo (JP); Satoshi Yamamoto, Settsu (JP)

(73) Assignee: HITACHI MAXELL, LTD., Ibaraki (JP)

( * ) Notice: Subject to any disclaimer, the term of this patent is extended or adjusted under 35 U.S.C. 154(b) by 456 days.

(21) Appl. No.: 13/768,731

(22) Filed: Feb. 15, 2013

(65) Prior Publication Data

US 2013/0163369 A1    Jun. 27, 2013

Related U.S. Application Data

(63) Continuation of application No. PCT/JP2011/055349, filed on Mar. 8, 2011.

(51) Int. Cl.
*B29B 7/86*    (2006.01)
*B29B 7/42*    (2006.01)
(Continued)

(52) U.S. Cl.
CPC ... *B29B 7/86* (2013.01); *B29B 7/42* (2013.01); *B29C 45/1816* (2013.01);
(Continued)

(58) Field of Classification Search
CPC .............. B29B 7/42; B29B 7/86; B29B 7/84; B29C 2045/605; B29C 45/52; B29C 45/522
USPC ......................................................... 366/82
See application file for complete search history.

(56) References Cited

U.S. PATENT DOCUMENTS 3,131,433 A * 5/1964 Volland ............................ 366/89
3,590,439 A * 7/1971 Swanson ................... 137/533.17
(Continued)

FOREIGN PATENT DOCUMENTS

JP    A-11-216762    8/1999
JP    A-11-292921    10/1999
(Continued)

OTHER PUBLICATIONS

Written Opinion of the International Searching Authority issued in International Patent Application No. PCT/JP2011/055349 mailed on Jun. 14, 2011 (with translation).

(Continued)

*Primary Examiner* — Tony G Soohoo
(74) *Attorney, Agent, or Firm* — Oliff PLC

(57) ABSTRACT

A kneading apparatus includes a plasticizing cylinder in which a high pressure kneading zone and a pressure reduction zone are formed adjacently in this order from an upstream side so that a molten resin obtained by plasticizing a thermoplastic resin and a pressurized fluid are kneaded with each other in the high pressure kneading zone, and gasified pressurized fluid, which is gasified by reducing a resin internal pressure, is separated in the pressure reduction zone from the molten resin kneaded with the pressurized fluid, a screw which is arranged rotatably and movably back and forth in the plasticizing cylinder; and a downstream side seal mechanism which is provided between the high pressure kneading zone and the pressure reduction zone and which makes communication and disconnection between the high pressure kneading zone and the pressure reduction zone in accordance with a rotation state of the screw.

9 Claims, 6 Drawing Sheets

(51) Int. Cl.
- B29C 47/38 (2006.01)
- B29C 47/44 (2006.01)
- B29C 47/54 (2006.01)
- B29C 47/60 (2006.01)
- B29C 47/66 (2006.01)
- B29C 47/40 (2006.01)
- B29C 45/18 (2006.01)
- B29C 45/52 (2006.01)
- B29C 45/17 (2006.01)
- B29C 45/60 (2006.01)

(52) U.S. Cl.
CPC .............. *B29C 45/52* (2013.01); *B29C 47/385* (2013.01); *B29C 47/40* (2013.01); *B29C 47/44* (2013.01); *B29C 47/54* (2013.01); *B29C 47/6018* (2013.01); *B29C 47/6031* (2013.01); *B29C 47/6037* (2013.01); *B29C 47/6056* (2013.01); *B29C 47/661* (2013.01); *B29C 47/667* (2013.01); *B29C 2045/1722* (2013.01); *B29C 2045/605* (2013.01)

(56) References Cited

U.S. PATENT DOCUMENTS

| | | | | |
|---|---|---|---|---|
| 3,698,694 | A | * | 10/1972 | Zeug et al. ............... 366/78 |
| 3,889,932 | A | * | 6/1975 | Brandis et al. ............ 366/82 |
| 3,942,773 | A | * | 3/1976 | Csongor .................... 366/82 |
| 4,106,113 | A | * | 8/1978 | Laimer et al. ............. 366/79 |
| 5,401,161 | A | * | 3/1995 | Long ........................ 425/563 |
| 5,851,065 | A | * | 12/1998 | Ikeda et al. ............... 366/76.6 |
| 2006/0003042 | A1 | * | 1/2006 | Inoue et al. ............... 425/204 |
| 2013/0285273 | A1 | * | 10/2013 | Yusa et al. ................ 264/50 |
| 2014/0004335 | A1 | * | 1/2014 | Yusa et al. ................ 428/314.4 |

FOREIGN PATENT DOCUMENTS

| | | | |
|---|---|---|---|
| JP | A-2001-038722 | | 2/2001 |
| JP | A-2002-307530 | | 10/2002 |
| JP | A-2002-355880 | | 12/2002 |
| JP | A-2003-053725 | | 2/2003 |
| JP | A-2003-094477 | | 4/2003 |
| JP | A-2006-001252 | | 1/2006 |
| JP | B2-3964447 | | 8/2007 |
| JP | 2008-18581 A | * | 1/2008 |
| JP | A-2008-018581 | | 1/2008 |
| JP | A-2009-196165 | | 9/2009 |
| JP | A-2009-298838 | | 12/2009 |
| JP | A-2010-253703 | | 11/2010 |
| WO | WO 2012/120637 | * | 9/2013 |

OTHER PUBLICATIONS

Office Action issued in Japanese Patent Application No. 2013-503275 mailed on Sep. 2, 2014 (with translation).

Jun. 14, 2011 International Search Report issued in International Application No. PCT/JP2011/055349 (with translation).

Kimura et al., "Reactive blending under supercritical carbon dioxide," Proceeding of 17$^{th}$ JSPP Symposium of Japan Society of Polymer Processing, 2009, pp. 227-228.

Kimura et al., "Reactive blending under supercritical carbon dioxide," Proceeding of 17$^{th}$ JSPP Symposium of Japan Society of Polymer Processing, 227, 2009.

* cited by examiner

KNEADING APPARATUS AND METHOD FOR PRODUCING THERMOPLASTIC RESIN MOLDED PRODUCT

CROSS REFERENCE TO RELATED APPLICATION

This application is a Continuation application of International Application No. PCT/JP2011/055349 which was filed on Mar. 8, 2011.

BACKGROUND OF THE INVENTION

1. Field of the Invention

The present invention relates to a kneading apparatus for producing a thermosetting resin molded product by using a pressurized fluid containing high pressure carbon dioxide, and a method for producing the thermosetting resin molded product based on the use of the kneading apparatus.

2. Description of the Related Art

In recent years, various types of injection molding methods and extrusion molding methods have been investigated, in which high pressure carbon dioxide such as supercritical carbon dioxide or the like is used. In the case of the molding method as described above, a fluid having an extremely high pressure is introduced into a molten resin, and hence it is possible to produce molded products having various functions. For example, in order to mutually compatibly dissolve polymers which are incompatible with each other, an injection molding method and an extrusion molding method are suggested for a polymer alloy, wherein molten resins and high pressure carbon dioxide are brought in contact and kneaded with each other in a plasticizing cylinder (Japanese Patent Application Laid-open No. 2003-94477 and Proceedings of 17th JSPP Symposium of Japan Society of Polymer Processing, 227 (2009)). In the molding methods as described above, the molten resin and high pressure carbon dioxide are brought in contact and kneaded with each other by means of a kneading apparatus which is provided with a screw contained in a plasticizing cylinder. On the other hand, a molding method is suggested, wherein supercritical carbon dioxide is introduced into a molten resin at an intermediate position of an extrusion machine having a vent portion in order to remove any hardly volatile component from the thermoplastic resin (Japanese Patent Application Laid-open No. 11-292921). Further, an injection molding method is suggested, wherein a molten resin of thermoplastic resin is injected and charged into a mold from a plasticizing cylinder, and then a pressurized fluid, which contains supercritical carbon dioxide and a functional material such as an organic metal complex or the like, is introduced into the mold to thereby produce a thermoplastic resin molded product including the functional material dispersed on a surface (Japanese Patent No. 3964447).

In the meantime, the solubility of high pressure carbon dioxide with respect to the resin is low. Therefore, in the case of the molding method including the step of singly bringing the molten resin and the pressurized fluid in contact with each other as described above, it is difficult to allow a large amount of high pressure carbon dioxide and the molten resin to be brought in contact and kneaded with each other. Therefore, when the functional material is used together with high pressure carbon dioxide, it is also difficult to introduce the functional material into the molten resin at a high concentration. From such a viewpoint, a method for producing a molded product is suggested, wherein an kneading apparatus, in which an introducing port for introducing a pressurized fluid is provided on an upper side surface of a plasticizing cylinder and a vent port is provided on the downstream side from the introducing port, is used so that a molten resin and the pressurized fluid containing high pressure carbon dioxide and a functional material are brought in contact and kneaded with each other in the plasticizing cylinder, and then the resin internal pressure of the molten resin is lowered before being injected and charged into a mold to separate only gasified carbon dioxide from the molten resin and discharge carbon dioxide from the vent port (Japanese Patent Application Laid-open No. 2009-298838). According to this molding method, it is possible to improve the concentration of the functional material to be introduced into the molten resin, while controlling the concentration of high pressure carbon dioxide in the molten resin.

However, in the case of the kneading apparatus as described in Japanese Patent Application Laid-open No. 2009-298838, a high pressure kneading zone and a pressure reduction zone are sealed by the molten resin itself, wherein the molten resin and the pressurized fluid containing high pressure carbon dioxide are brought in contact and kneaded with each other in the high pressure kneading zone, and the resin internal pressure of the molten resin is lowered to separate gasified carbon dioxide from the molten resin brought in contact and kneaded with the pressurized fluid in the pressure reduction zone. Therefore, gasified carbon dioxide tends to be discharged from the high pressure kneading zone via the pressure reduction zone to the outside of the plasticizing cylinder during the period of the contact and kneading as well. The resin internal pressure tends to be lowered in the high pressure kneading zone. As a result, it is difficult to perform the contact and kneading for the molten resin and the pressurized fluid while maintaining the high pressure state. Further, a problem arises such that high pressure carbon dioxide is easily vaporized from the pressurized fluid in the high pressure kneading zone during the contact and kneading.

In view of the above, a kneading apparatus is suggested, the kneading apparatus including a plasticizing cylinder and a screw which is arranged rotatably and movably back and forth in the plasticizing cylinder, wherein a through-hole, which penetrates through a first area and a second area, is bored through the screw in order to separate an interior of the plasticizing cylinder into the first area in which a molten resin and a pressurized fluid are brought in contact and kneaded with each other and the second area in which gasified carbon dioxide is discharged, and a poppet valve, which is openable/closable by a spring, is arranged for the through-hole (Japanese Patent Application Laid-open No. 2010-253703). According to the kneading apparatus as described above, when the pressure of the molten resin in the first area exceeds the pressing force of the spring, then the poppet valve is opened, and the molten resin in the first area is allowed to flow into the second area. Therefore, the molten resin, which exists in any arbitrary area in the plasticizing cylinder, can be maintained at a desired pressure.

However, in the case of the kneading apparatus which has, as the seal mechanism, the poppet valve that is openable/closable by controlling the pressure by means of the spring as described above, the molten resin does not pass through the poppet valve as long as the resin internal pressure in the first area does not exceed the spring pressure. Therefore, in the first area, the molten resin receives the flow resistance by the spring pressure even before the pressurized fluid is introduced. Further, if the dispersibility of the pressurized fluid in the molten resin is taken into consideration, it is desired that the high pressure state is maintained as long as possible during the contact and kneading. Therefore, when the kneading apparatus as described above is used, it is necessary that the poppet valve having a high spring pressure should be used so that the poppet valve is not opened during a predetermined period of the contact and kneading even when the interior of the first area is at a pressure which is provided by adding the pressure of the pressurized fluid to the pressure obtained before introducing the pressurized fluid. As a result, in the case of the kneading apparatus as described above, the plasticizing ability is not only lowered due to the spring pressure during the plasticization, but the plasticizing ability also tends to be lowered, because the first area and the second area are not communicated with each other as long as the resin internal pressure of the molten resin in the first area does not exceeds the high spring pressure during the contact and kneading as well. Therefore, when a resin having a high viscosity is used, the plasticization and weighing tend to be unstable. Further, in the case of the kneading apparatus as described above, the heated molten resin passes through the through-hole provided in the screw. Therefore, the spring, which is arranged in the through-hole, is deteriorated by the heat of the molten resin in the course of the use of the molding machine for a long period of time, and the spring constant tends to be changed. As a result, it is difficult to constantly maintain the pressure of the high pressure kneading zone for a long period of time. A problem arises such that the molding cannot be performed stably in the industrial production.

SUMMARY OF THE INVENTION

The present teaching has been made in order to solve the problems as described above. An object of the present teaching is to provide a kneading apparatus which has a high plasticizing ability and which makes it possible to stably produce a molded product of a thermoplastic resin for a long period of time when the molded product of the thermoplastic resin is produced by introducing a pressurized fluid into a plasticizing cylinder so that a molten resin, which is obtained by plasticizing the thermoplastic resin, is brought in contact and kneaded with the pressurized fluid in the plasticizing cylinder. Another object of the present teaching is to provide a method for producing a molded product of a thermoplastic resin based on the use of the kneading apparatus.

According to a first aspect of the present teaching, there is provided a kneading apparatus including: a plasticizing cylinder in which a high pressure kneading zone and a pressure reduction zone are formed adjacently in this order from an upstream side so that a molten resin obtained by plasticizing a thermoplastic resin and a pressurized fluid are kneaded with each other in the high pressure kneading zone, and gasified pressurized fluid, which is gasified by reducing a resin internal pressure, is separated in the pressure reduction zone from the molten resin kneaded with the pressurized fluid, a screw which is arranged rotatably and movably back and forth in the plasticizing cylinder; and a downstream side seal mechanism which is provided between the high pressure kneading zone and the pressure reduction zone and which makes communication and disconnection between the high pressure kneading zone and the pressure reduction zone in accordance with a rotation state of the screw.

According to a second aspect of the present teaching, there is provided a method for producing a thermoplastic resin molded product by using the kneading apparatus of the first aspect, the method including: a kneading step of kneading the molten resin and the pressurized fluid with each other at a high pressure when disconnecting the high pressure kneading zone and the pressure reduction zone from each other by the downstream side seal mechanism; and a separating step of separating the gasified pressurized fluid from the molten resin kneaded with the pressurized fluid when making communication between the high pressure kneading zone and the pressure reduction zone by the downstream side seal mechanism to lower a resin internal pressure of the molten resin kneaded with the pressurized fluid.

The object, the feature, the aspect, and the advantage of the present teaching will be more clarified by the following detailed description and the accompanying drawings.

DESCRIPTION OF THE PREFERRED EMBODIMENTS

An explanation will be made below with reference to the drawings about a kneading apparatus according to an embodiment of the present teaching and a method for producing a thermoplastic resin molded product based on the use of the kneading apparatus.

Figure 1:
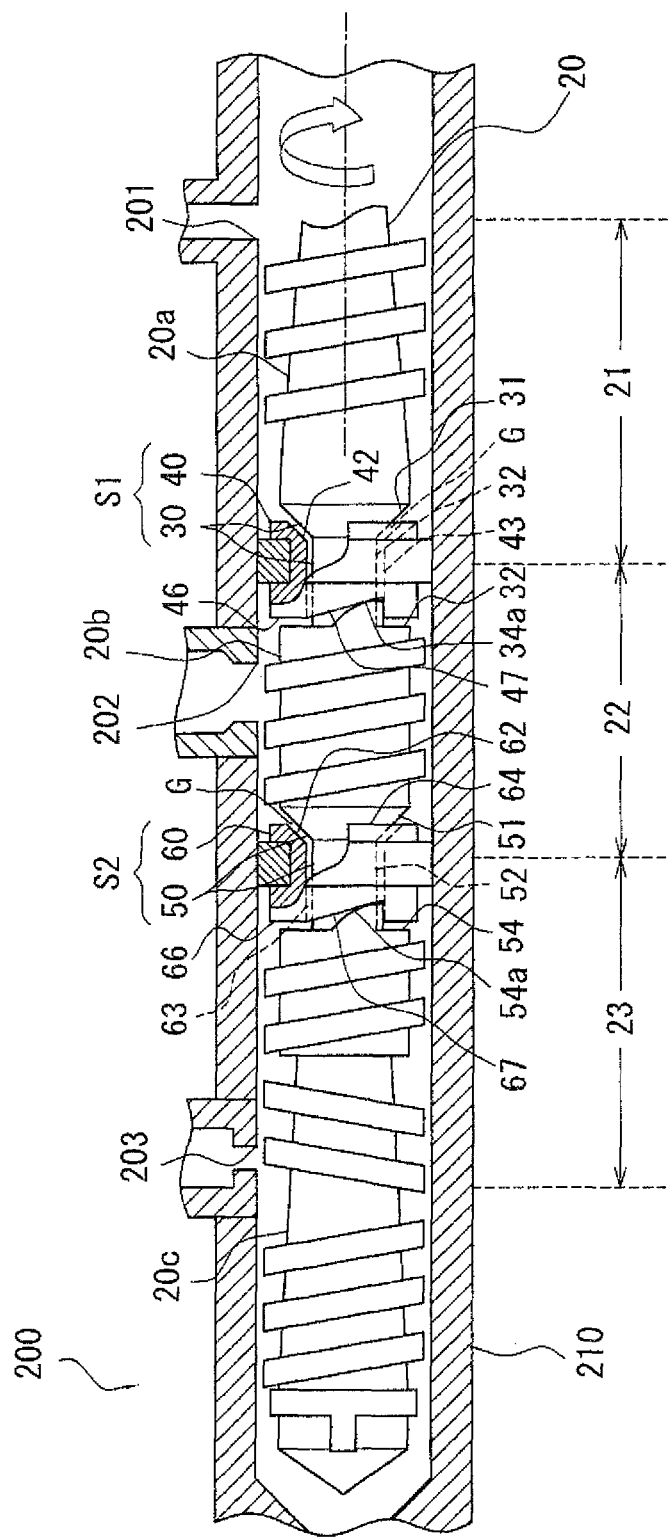
FIG. 1 shows a schematic sectional view of main parts of components illustrating an exemplary kneading apparatus according to an embodiment of the present teaching, depicting a state in which a high pressure kneading zone and a pressure reduction zone are communicated with each other.
Figure 2:
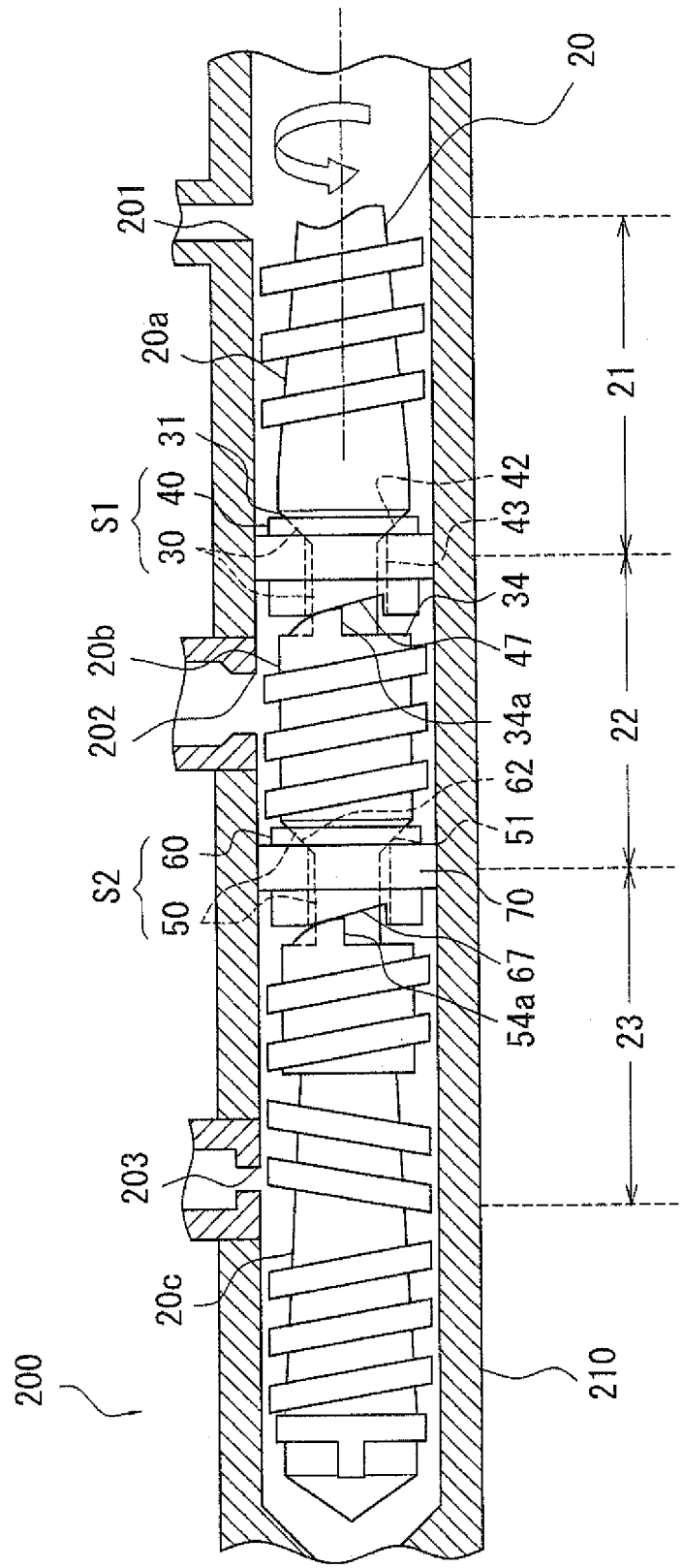
FIG. 2 shows a schematic sectional view of main parts of components illustrating the exemplary kneading apparatus according to the embodiment of the present teaching, depicting a state in which the high pressure kneading zone and the pressure reduction zone are disconnected from each other.
Figure 3:
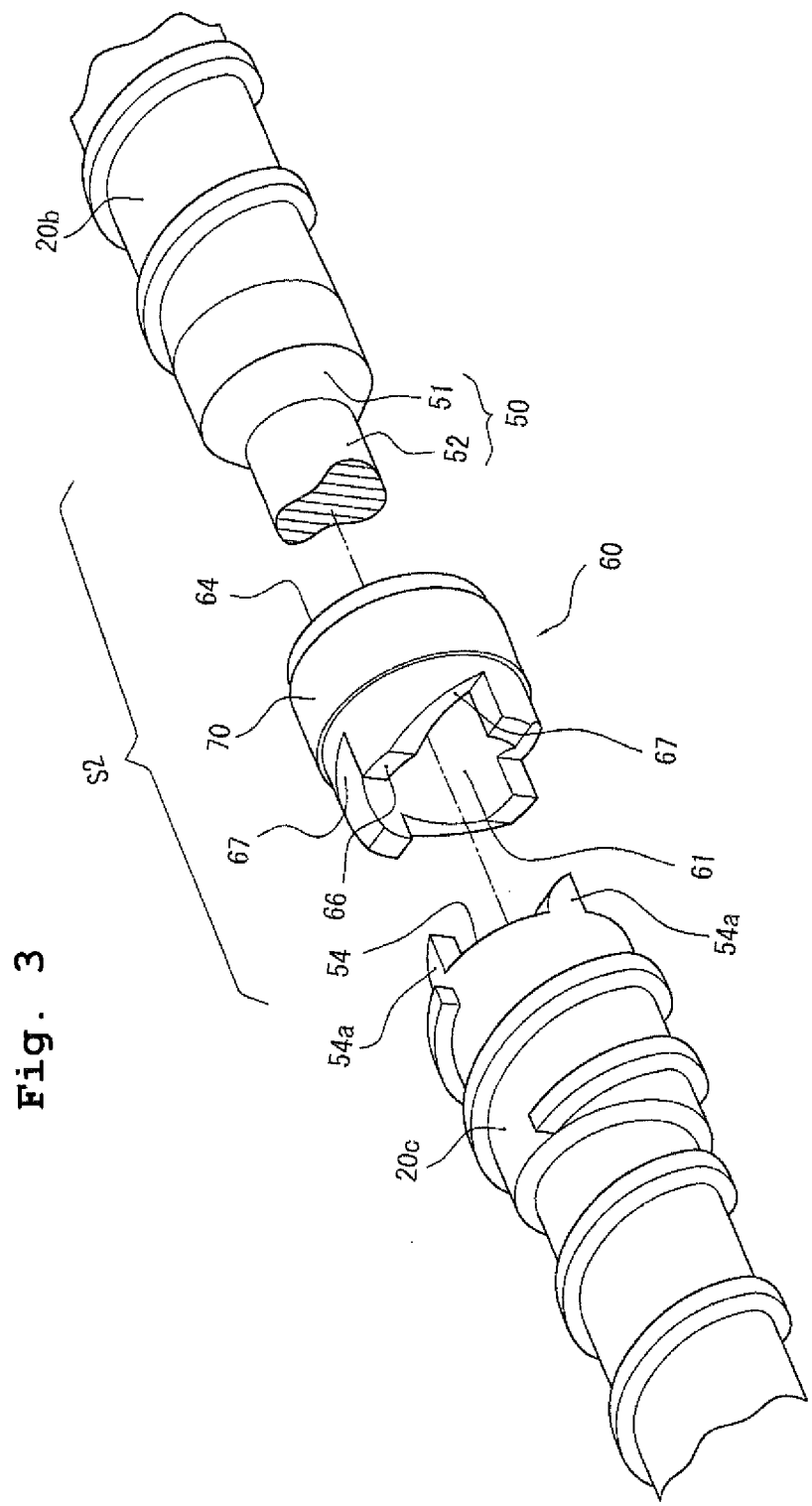
FIG. 3 shows a schematic perspective view illustrating an exemplary seal mechanism of the kneading apparatus according to the embodiment of the present teaching.

FIGS. 1 and 2 show schematic sectional views of main parts of components illustrating an exemplary kneading apparatus according to the embodiment of the present teaching, wherein FIG. 1 depicts a state in which a high pressure kneading zone and a pressure reduction zone are communicated with each other, and FIG. 2 depicts a state in which the high pressure kneading zone and the pressure reduction zone are disconnected from each other. FIG. 3 shows a schematic perspective view illustrating a seal mechanism shown in FIGS. 1 and 2.

The kneading apparatus 200 is provided with a plasticizing cylinder 210, and a screw 20 which is arranged rotatably and movably back and forth in the plasticizing cylinder 210. Although not shown in the drawings, rotary driving mechanism such as a rotation motor or the like for rotating the screw 20 and moving mechanism such as a ball screw and a motor or the like for driving the same to move the screw 20 back and forth are connected to a back end portion of the plasticizing cylinder 210 disposed on the upstream side. A nozzle portion for injecting a molten resin is connected to a forward end portion disposed on the downstream side. As shown in FIGS. 1 and 2, the kneading apparatus 200 of this embodiment is constructed in the same manner as the construction of any conventionally known kneading apparatus, wherein the forward rotation is performed to feed the molten resin frontwardly (toward the nozzle portion) when the screw 20 is rotated counterclockwise, while the reverse rotation is performed when the screw 20 is rotated clockwise, as viewed from the backward side of the plasticizing cylinder 210.

Those formed on the upper side surface of the plasticizing cylinder 210 are, as referred to in the following order from the upstream side, a resin supply port 201 for supplying the thermoplastic resin to the plasticizing cylinder 210, an introducing port 202 for introducing a pressurized fluid containing high pressure carbon dioxide into the plasticizing cylinder 210, and a vent port 203 for discharging gasified carbon dioxide from the inside of the plasticizing cylinder 210. As described later on, a resin supplying hopper 211 and an introducing valve 212 are arranged for the resin supply port 201 and the introducing port 202 respectively, and a vacuum pump 220 is connected to the vent port 203 via a buffer container 219. Further, a band heater (not shown) is arranged on an outer wall surface of the plasticizing cylinder 210. Accordingly, the plasticizing cylinder 210 is heated, and the thermoplastic resin is plasticized. Further, an unillustrated pressure gauge and an unillustrated temperature sensor are provided at a position opposed to the introducing port 202 disposed on the lower side surface of the plasticizing cylinder 210 and a position opposed to the vent port 203 respectively.

Therefore, in the kneading apparatus 200 of this embodiment, when the screw 20 is rotated forwardly, the thermoplastic resin is supplied from the resin supply port 201 into the plasticizing cylinder 210. The thermoplastic resin is plasticized by the band heater to provide the molten resin which is fed frontwardly. The molten resin, which is fed to a position disposed in the vicinity of the introducing port 202, is brought in contact and kneaded with the introduced pressurized fluid at a high pressure. Subsequently, the resin internal pressure of the molten resin brought in contact and kneaded with the pressurized fluid is lowered, and thus gasified carbon dioxide is separated from the molten resin. Gasified carbon dioxide is discharged from the vent port 203. The molten resin, which is further fed frontwardly, is extruded by the forward end portion of the screw 20. The pressure of the molten resin serves as the reaction force with respect to the screw 20. The screw 20 is moved backwardly by the reaction force, and thus the weighing is performed. Accordingly, the plasticizing zone 21 in which the thermoplastic resin is plasticized to provide the molten resin, the high pressure kneading zone 22 in which the molten resin and the pressurized fluid introduced from the introducing port 202 are brought in contact and kneaded with each other at the high pressure, and the pressure reduction zone 23 in which carbon dioxide separated from the molten resin is discharged from the vent port 203 by lowering the resin internal pressure of the molten resin brought in contact and kneaded with the pressurized fluid are formed in the plasticizing cylinder 210, as referred to in this order from the upstream side. In order to efficiently perform the contact and kneading for the molten resin and the pressurized fluid, a plurality of introducing ports 202 and a plurality of vent ports 203 may be provided for the plasticizing cylinder 210, and a plurality of high pressure kneading zones 22 and a plurality of pressure reduction zones 23 may be formed in the plasticizing cylinder 210.

As shown in FIGS. 1 and 2, an upstream side seal mechanism S1 and a downstream side seal mechanism S2, which make communication and disconnection between the zones 21, 22, 23 in accordance with the rotation state of the screw 20, are arranged between the plasticizing zone 21, the high pressure kneading zone 22, and the pressure reduction zone 23 described above respectively. Accordingly, when the pressurized fluid is introduced into the high pressure kneading zone 22, the upstream side and the downstream side of the high pressure kneading zone 22 are mechanically sealed in accordance with the rotation state of the screw 20. Therefore, the high pressure kneading zone 22 can be reliably disconnected (shut off) from the adjoining zones 21, 23. According to the seal mechanisms S1, S2 of this embodiment, the high pressure kneading zone 22 can be communicated and disconnected with respect to the adjoining zones 21, 23 in accordance with the rotation state of the screw 20 without using any pressure control. Therefore, the flow resistance of the molten resin is small. Further, the high pressure kneading zone 22 can be sealed from the adjoining zones 21, 23 in accordance with the rotation state of the screw 20. Therefore, the pressure of the high pressure kneading zone 22 can be maintained at any arbitrary timing. Therefore, even when the resin having a high viscosity is brought in contact and kneaded, it is possible to maintain the high plasticizing ability. When the mechanical seal mechanisms S1, S2, which exhibit the sealing performance in accordance with the rotation state of the screw 20 as described above, are used, the sealing performance is scarcely deteriorated even when the high temperature molten resin passes through the seal mechanisms S1, S2. Therefore, the pressure of the high pressure kneading zone 22 is scarcely changed even after the molding machine is operated for a long period of time. Therefore, it is possible to stably produce the thermoplastic resin molded product for a long period of time. The seal mechanisms S1, S2 communicate and disconnect the zones 21, 23 adjacent to the high pressure kneading zone 22 in accordance with the rotation state of the screw 20. Therefore, for example, when the forward rotation and the reverse rotation of the screw 20 are performed at arbitrary timings, then the resin internal pressure of the molten resin brought in contact and kneaded with the pressurized fluid can be lowered in a state in which the molten resin is allowed to stay in the high pressure kneading zone 22, and gasified carbon dioxide can be separated from the molten resin. As a result, the molten resin, in which the concentration of carbon dioxide is lowered, can be repeatedly brought in contact and kneaded with the pressurized fluid without feeding the molten resin frontwardly. Further, when the pressurized fluid containing a functional material is used, it is possible to produce a molded product in which the functional material is dispersed at a high concentration.

In the kneading apparatus 200 of this embodiment, the seal mechanism, which communicates and disconnects the high pressure kneading zone 22 with respect to the adjoining other zones 21, 23 in accordance with the rotation state of the screw 20 described above, is preferably provided at least on the downstream side of the high pressure kneading zone 22. It is more preferable that the seal mechanisms are provided on both of the upstream side and the downstream side of the high pressure kneading zone 22. That is, as understood from FIGS. 1 and 2, when the pressurized fluid is introduced into the high pressure kneading zone 22, the high pressure pressurized fluid acts on the seal mechanism S1 so that the plasticizing zone 21 and the high pressure kneading zone 22 are disconnected from each other on the upstream side of the high pressure kneading zone 22. On the other hand, on the downstream side of the high pressure kneading zone 22, the pressurized fluid and the molten resin allowed to flow from the upstream side act on the downstream side seal mechanism S2 so that the high pressure kneading zone 22 and the pressure reduction zone 22 are communicated with each other. Usually, the molten resin is charged on the upstream side of the high pressure kneading zone 22, and hence the pressurized fluid hardly leaks. Therefore, when a simple and convenient seal mechanism such as a check valve (non-return valve) or the like having a low spring pressure is arranged on the upstream side of the high pressure kneading zone 22, and the downstream side seal mechanism S2, which communicates and disconnects the high pressure kneading zone 22 and the pressure reduction zone 23 in accordance with the rotation state of the screw 20, is arranged at least on the downstream side of the high pressure kneading zone 22, then the high pressure kneading zone 22, in which the sealing performance tends to be lowered or deteriorated, can be reliably disconnected from the pressure reduction zone 23, and the high pressure state of the high pressure kneading zone 22 can be maintained during the contact and kneading. In this embodiment, the upstream side seal mechanism S1 and the downstream side seal mechanism S2, which are basically constructed in the same manner, are used. Therefore, the following explanation will be made principally about the downstream side seal mechanism S2.

As shown in FIGS. 1 to 3, the screw 20 of this embodiment has a reduced diameter portion 50 which is disposed in a boundary area between the high pressure kneading zone 22 and the pressure reduction zone 23 and which has a reduced diameter as compared with those of areas adjacent to the boundary area. A downstream side seal ring 60 is externally fitted to the reduced diameter portion 50 in such a loosely fitted state that the downstream side seal ring 60 is movable in the axial direction (front-back direction) within a range of the reduced diameter portion 50. The downstream side seal mechanism S2 is constructed by the reduced diameter portion 50 and the downstream side seal ring 60. The screw 20 is divided into a first screw portion 20a, a second screw portion 20b, and third screw portion 20c as disposed in this order from the upstream side in order that the upstream side and downstream side seal rings 40, 60 are externally fitted to the reduced diameter portions 30, 50. The divided portions are screw-fastened with unillustrated screws at the reduced diameter portions 30, 50.

The reduced diameter portion 50, which is arranged between the high pressure kneading zone 22 and the pressure reduction zone 23, is constructed by a truncated cone portion (seal portion) 51 which is interconnected from the second screw portion 20b disposed on the upper side and which has a tapered surface inclined frontwardly, and a cylindrical portion 52 which is interconnected from the truncated cone portion 51 and which has a horizontal surface extending horizontally in the axial direction. Projections 54a, which serve as fastening portions to prevent the downstream side seal ring 60 from being rotated, are formed at a plurality of positions at predetermined intervals in the circumferential direction on an end surface 54 of the third screw portion 20c disposed on the downstream side. The structure of the reduced diameter portion 50 is not specifically limited provided that the high pressure kneading zone 22 and the pressure reduction zone 23 can be communicated with each other and disconnected from each other. For example, the reduced diameter portion 50 may have such a structure that cylindrical portions having different diameters are interconnected to one another. Alternatively, the reduced diameter portion 50 may have such a structure that the truncated cone portion 51 is arranged on the downstream side.

As shown in FIG. 3, the downstream side seal ring 60 has a through-hole 61 so that the downstream side seal ring 60 is externally fitted to the reduced diameter portion 50 of the screw 20. As shown in FIGS. 1 and 2, the through-hole 61 is constructed by interconnecting a tapered portion 62 which has a tapered surface (contact surface) having diameters reduced frontwardly and an annular portion 63 which extends horizontally frontwardly from the tapered portion 62. The tapered surface of the tapered portion 62 is formed to abut against at least a part of the tapered surface of the truncated cone portion 51 in a tight contact state. The structure of the through-hole 61 is not specifically limited provided that the high pressure kneading zone 22 and the pressure reduction zone 23 can be connected with each other and disconnected from each other. For example, the through-hole 61 may have such a structure that a plurality of annular portions having different inner diameters are formed. Alternatively, the through-hole 61 may have such a structure that the tapered portion 62 is arranged on the downstream side. Further, the inner diameter of the annular portion 63 of the through-hole 61 is formed to be larger than the diameter of the cylindrical portion 52 of the reduced diameter portion 50 described above so that the downstream side seal ring 60 is movable in the axial direction within a range of the reduced diameter portion 50 of the screw 20. Cutouts 67, which are inclined to be deep in the clockwise direction as viewed from the downstream side, are formed as fastening objective portions at a plurality of positions in the circumferential direction on a downstream side ring surface 66 of the downstream side seal ring 60. Accordingly, the downstream side seal ring 60 is movable in the axial direction within a range of the depth of the cutout 67 with respect to the screw 20 in accordance with the rotation state of the screw 20. When the projections 54a are engaged with the cutouts 67, any further movement of the downstream side seal ring 60 in the axial direction is regulated with respect to the screw 20.

Therefore, when the downstream side seal ring 60 is moved to the downstream side with respect to the screw 20, then the tapered surface of the truncated cone portion 51 is separated from the tapered surface of the tapered portion 62, and the gap G, which serves as the passage (path) for the molten resin and high pressure carbon dioxide, is opened between the inner circumferential surface of the downstream side seal ring 60 and the outer circumferential surface of the reduced diameter portion 50 of the screw 20. On the other hand, when the downstream side seal ring 60 is moved to the upstream side with respect to the screw 20, then the tapered surface of the truncated cone portion 51 abuts against the tapered surface of the tapered portion 62, and the gap G is closed between the inner circumferential surface of the downstream side seal ring 60 and the outer circumferential surface of the reduced diameter portion 50 of the screw 20. Further, when the downstream side seal ring 60 is moved to the upstream side, and the projections 54a and the cutouts 67 are engaged with each other, then the movement of the downstream side seal ring 60 is regulated. Therefore, the downstream side seal ring 60 corotates together with the screw 20. Accordingly, the abutment state is maintained between the tapered surface of the truncated cone portion 51 and the tapered surface of the tapered portion 62 during the contact and kneading. It is possible to reliably seal the high pressure kneading zone 22. However, when the communication is made between the plasticizing zone 21 and the high pressure kneading zone 22 and between the high pressure kneading zone 22 and the pressure reduction zone 23, then a state is given, in which the tapered surfaces of the truncated cone portions 31, 51 and the tapered surfaces of the tapered portions 42, 62 are separated from each other, and the molten resin as well as the pressurized fluid is allowed to advance into the gap G from the upstream side. Therefore, when the upstream side and downstream side seal rings 40, 60 are moved to the downstream side, the tapered surfaces of the truncated cone portions 31, 51 hardly abut against the tapered surfaces of the tapered portions 42,

62, even when the upstream side and downstream side seal rings 40, 60 do not corotate together with the screw 20. Therefore, it is possible to maintain the communicated state between the high pressure kneading zone 22 and the adjoining zones 21, 23. Any arbitrary structure can be adopted for each of the fastening portions and the fastening objective portions which are provided for the screw 20 and the upstream side and downstream side seal rings 40, 60 respectively, provided that the structure enables the upstream side and downstream side seal rings 40, 60 to corotate together with the screw 20 in the rotation-prevented (stopped) state when the fastening portions and the fastening objective portions are engaged with each other. For example, a pin may be used as the fastening portion or the fastening objective portion. Further, the fastening portion may be provided on the downstream side of the second screw portion 20*b* and the fastening objective portion may be provided on the upstream side of the downstream side seal ring 60 in conformity with the structure of the truncated cone portion 51 and/or the tapered portion 62.

Figure 4:
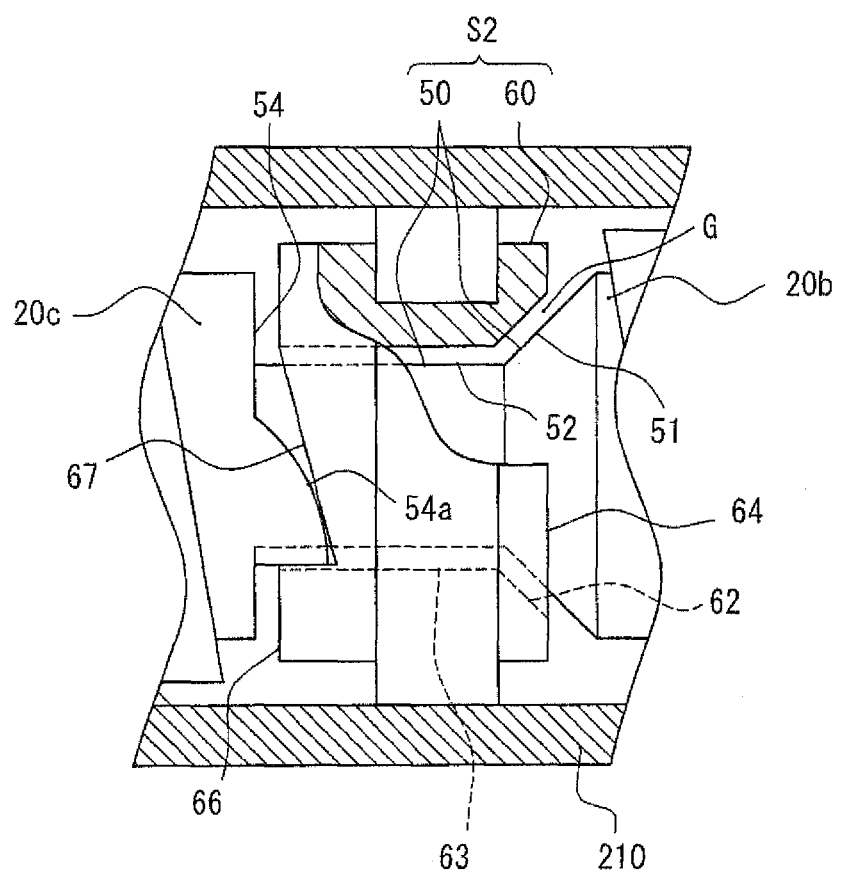
FIG. 4 shows a schematic enlarged sectional view of main parts of components illustrating the exemplary seal mechanism of the kneading apparatus according to the embodiment of the present teaching.
Figure 5:
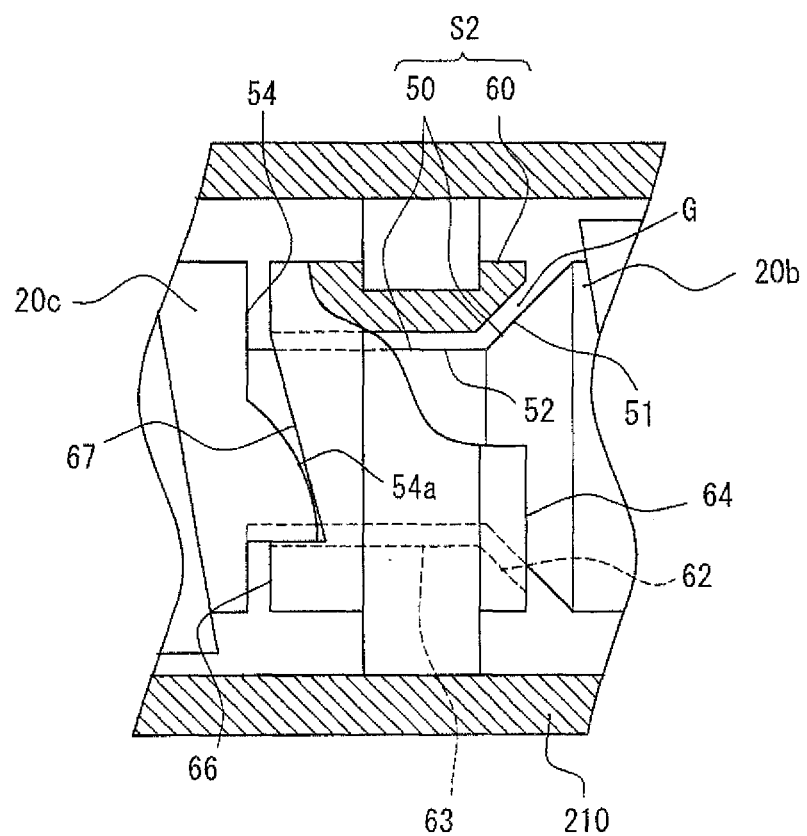
FIG. 5 shows a schematic enlarged sectional view of main parts of components illustrating another exemplary seal mechanism of the kneading apparatus according to the embodiment of the present teaching.

An outer seal member 70 made of metal is fitted to the outer circumferential surface of the downstream side seal ring 60 so that the outer seal member 70 protrudes from the outer circumferential surface of the downstream side seal ring 60. Accordingly, the sealing performance is secured between the downstream side seal ring 60 and the plasticizing cylinder 210. An outer seal member made of resin may be used. Further, as shown in FIG. 4, in the case of the downstream side seal ring 60 of this embodiment, the outer diameter of the upstream side ring surface 64 is formed to be larger than the diameter of the opposing second screw portion 20*h* disposed an the upstream side. Therefore, when the high pressure kneading zone 22 and the pressure reduction zone 23 are disconnected from each other, the downstream side seal ring 60 is arranged in such a mode that the downstream side seal ring 60 slightly protrudes from the second screw portion 20*b* in the radial direction on the upstream side. However, as shown in FIG. 5, the outer diameter of the upstream side ring surface 64 may be formed to be substantially the same as or smaller than the diameter of the opposing second screw portion 20*b* disposed on the upstream side. That is, in the high pressure kneading zone 22, the high pressure pressurized fluid is introduced from the introducing port 202. Therefore, when the outer diameter of the upstream side ring surface 64 is larger than the diameter of the opposing second screw portion 20*b* disposed on the upstream side, then the upstream side ring surface 64, which protrudes from the screw 20, is pushed frontwardly by the pressure brought about by the pressurized fluid, and thus the rotation of the screw 20 is stopped or the number of revolutions of the reverse rotation is lowered without forwardly rotating the screw 20. Accordingly, it is possible to immediately make communication between the high pressure kneading zone 22 and the pressure reduction zone 23. On the other hand, when the outer diameter of the upstream side ring surface 64 is substantially the same as or smaller than the diameter of the opposing second screw portion 20*b* disposed on the upstream side, the pressure, which is brought about by the pressurized fluid, is not applied to the upstream side ring surface 64. Therefore, the high pressure kneading zone 22 and the pressure reduction zone 23 can be disconnected from each other more reliably during the contact and kneading.

The construction of the upstream side seal mechanism S1 is the same as or equivalent to that of the downstream side seal mechanism S2 described above. As shown in FIGS. 1 and 2, the reduced diameter portion 30 having the truncated cone portion (seal portion) 31 is arranged between the plasticizing zone 21 and the high pressure kneading zone 22, and projections 34*a* are provided on an end surface 34 of the second screw portion 20*b* disposed on the upstream side. An upstream side seal ring 40 is externally fitted to the reduced diameter portion 30 in a loosely fitted state so that the upstream side seal ring 40 is movable in the axial direction (front-back direction) within a range of the reduced diameter portion 30. Further, the through-hole of the upstream side seal ring 40 is formed with a tapered portion 42 which has a tapered surface (contact surface) and an annular portion 43 which has a diameter larger than the diameter of the cylindrical portion 32. Further, cutouts 47, which are engageable with the projections 34*a* provided on the end surface 34 of the second screw portion 20*b*, are formed at a plurality of positions in the circumferential direction on a downstream side ring surface 46 of the upstream side seal ring 40. Accordingly, in the same manner as the downstream side seal mechanism S2, when the upstream side seal ring 40 is moved to the downstream side with respect to the screw 20, then the tapered surface of the truncated cone portion 31 is separated from the tapered surface of the tapered portion 42, and the gap G is opened between the inner circumferential surface of the upstream side seal ring 40 and the outer circumferential surface of the reduced diameter portion 30. On the other hand, when the upstream side seal ring 40 is moved to the upstream side with respect to the screw 20, then the tapered surface of the truncated cone portion 31 abuts against the tapered surface of the tapered portion 42, and the gap G is closed between the inner circumferential surface of the upstream side seal ring 40 and the outer circumferential surface of the reduced diameter portion 30. Further, when the projections 34*a* and the cutouts 47 are engaged with each other, then the upstream side seal ring 40 corotates together with the screw 20.

Next, an explanation will be made about the operation of the seal mechanisms S1, S2 described above in accordance with the steps performed by the kneading apparatus 200. As shown in FIG. 1, when the screw 20 is rotated forwardly (counterclockwise), the upstream side and downstream side seal rings 40, 60 are moved to the downstream side within the ranges of the reduced diameter portions 30, 50 respectively. Accordingly, the tapered surface of the truncated cone portion 31 and the tapered surface of the tapered portion 42 are separated from each other, the gap G is opened between the inner circumferential surface of the upstream side seal ring 40 and the outer circumferential surface of the reduced diameter portion 30 of the screw 20, and the plasticizing zone 21 and the high pressure kneading zone 22 are communicated with each other. When the projections 34*a* and the cutouts 47 are engaged with each other, the upstream side seal ring 40 corotates together with the screw 20. Accordingly, the communicated state is maintained between the plasticizing zone 21 and the high pressure kneading zone 22. Therefore, the molten resin can be smoothly fed from the plasticizing zone 21 to the high pressure kneading zone 22.

When a certain amount of the molten resin is fed to the high pressure kneading zone 22, as shown in FIG. 2, the screw 20 is reversely rotated (clockwise) at a number of revolutions of not less than a predetermined number of revolutions by means of the rotary driving mechanism. Accordingly, the upstream side and downstream side seal rings 40, 60 are moved to the upstream side in accordance with the reverse rotation of the screw 20. Therefore, the tapered surfaces of the truncated cone portions 31, 51 abut against the tapered surfaces of the tapered portions 42, 62. The gaps G, which have been formed between the inner circumferential surfaces of the upstream side and downstream side seal rings 40, 60 and the outer circumferential surfaces of the reduced diameter portions 30, 50, are closed. When the projections 34a, 54a of the screw 20 are engaged with the cutouts 47, 67 of the upstream side and downstream side seal rings 40, 60, the upstream side and downstream side seal rings 40, 60 corotate together with the screw 20. Accordingly, the disconnected state is maintained between the high pressure kneading zone 22 and the pressure reduction zone 23. Therefore, even when the high pressure pressurized fluid is introduced into the high pressure kneading zone 22, the molten resin and the pressurized fluid are prevented from flowing into the adjoining zones 21, 23 from the high pressure kneading zone 22. The molten resin and the pressurized fluid can be brought in contact and kneaded with each other at a high pressure.

When the high pressure kneading zone 22 and the adjoining zones 21, 23 are sealed by the upstream side and downstream side seal mechanisms S1, S2 so that the molten resin and the pressurized fluid are brought in contact and kneaded with each other, the screw 20 is subsequently rotated forwardly again by means of the rotary driving mechanism in order to lower the resin internal pressure of the molten resin. Accordingly, the projections 34a, 54a are disengaged from the cutouts 47, 67, and the upstream side and downstream side seal rings 40, 60 are moved to the downstream side in accordance with the forward rotation of the screw 20. Therefore, the tapered surfaces of the truncated cone portions 31, 51 are separated from the tapered surfaces of the tapered portions 42, 62, and the gaps G are opened between the inner circumferential surfaces of the upstream side and downstream side seal rings 40, 60 and the outer circumferential surfaces of the reduced diameter portions 30, 50. Accordingly, the high pressure kneading zone 22 and the pressure reduction zone 23 are communicated with each other, and the resin internal pressure of the molten resin is lowered. Therefore, gasified carbon dioxide is separated from the molten resin, and gasified carbon dioxide can be discharged from the vent port 203 provided in the pressure reduction zone 23. As described above, the downstream side seal ring 60 receives the pressure from the molten resin and the pressurized fluid after the molten resin and the pressurized fluid are brought in contact and kneaded with each other in the high pressure kneading zone 22. Therefore, the high pressure kneading zone 22 and the pressure reduction zone 23 can be communicated with each other as well by stopping the rotation of the screw 20 or lowering the number of revolutions of the reverse rotation of the screw 20.

Next, an explanation will be specifically made about a method for producing a thermoplastic resin molded product by using the kneading apparatus 200 of this embodiment.

In the method for producing the thermoplastic resin molded product of this embodiment, the plasticizing step is firstly performed such that a thermoplastic resin is supplied to the plasticizing cylinder 210 and the screw 20 is rotated so that the thermoplastic resin is thereby plasticized in the plasticizing zone to provide the molten resin.

Various resins can be used as the thermoplastic resin depending on the type of the objective resin molded product. Specifically, it is possible to use, for example, thermoplastic resins including, for example, polypropylene, polymethyl methacrylate, polyamide, polycarbonate, amorphous polyolefin, polyether imide, polyethylene terephthalate, polyether ether ketone, ABS-based resin, polyphenylene sulfide, polyamide imide, polylactic acid, and polycaprolactone, and composite materials thereof. Further, it is also possible to use those obtained by kneading various inorganic fillers such as glass fiber, talc, carbon fiber and the like with the thermoplastic resin as described above.

Subsequently, the kneading step is performed such that the molten resin and the pressurized fluid containing high pressure carbon dioxide are brought in contact and kneaded with each other in the high pressure kneading zone 22. In the kneading apparatus 200 of this embodiment, the molten resin and the pressurized fluid can be brought in contact and kneaded with each other in such a state that the high pressure kneading zone 22 and the adjoining zones 21, 23 are disconnected from each other by means of the upstream side and downstream side seal mechanisms S1, S2. Therefore, the leakage of the pressurized fluid from the high pressure kneading zone 22 is suppressed. The pressurized fluid can be introduced into the molten resin while maintaining the high pressure state. The pressure and the temperature of the high pressure kneading zone 22, which are provided during the contact and kneading, can be appropriately selected within a range in which the pressurized fluid is satisfactorily dispersed in the molten resin, depending on the types of the thermoplastic resin and the pressurized fluid to be used.

As for high pressure carbon dioxide, it is possible to use high pressure carbon dioxide in a liquid state, a gas state, or a supercritical state. High pressure carbon dioxide as described above is harmless to the human body, and it is excellent in the dispersibility in the molten resin. Further, high pressure carbon dioxide functions as a plasticizer, a solvent, and/or a compatibility-providing agent easily removable from the molten resin. The pressure and the temperature of high pressure carbon dioxide can be appropriately selected depending on the purpose thereof. For example, when high pressure carbon dioxide is used as the plasticizer or the compatibility-providing agent, it is possible to use high pressure carbon dioxide at a pressure of 3 to 5 MPa at which high pressure carbon dioxide has a low density. When a functional material is used, high pressure carbon dioxide having a high density is preferably used in order to raise the concentration of the functional material in the pressurized fluid. For example, when the functional material is used, then the pressure is not less than 4 MPa and preferably 5 to 25 MPa, and the temperature is not less than 0° C. and preferably 5 to 100° C., wherein high pressure carbon dioxide having a density of not less than 0.6 g/cm$^3$ is preferably used.

The pressurized fluid may contain the functional material. The functional material can be used without being specifically limited, provided that the functional material can be dispersed in high pressure carbon dioxide and the functional material can apply an expected function to the obtained molded product. The functional material as described above is specifically exemplified, for example, by compatibility-providing agents for facilitating alloy formation of various resins, surfactants, organic metal complexes, metal alkoxide, dyes, and nanocarbon. High pressure carbon dioxide itself functions as the plasticizer for the molten resin even in the case of a low pressure. However, it is also allowable to use various solvents and plasticizers in order to facilitate the plasticizing effect. When the functional material is used, the concentration of the functional material in the pressurized fluid can be appropriately selected while considering the type of the functional material to be used and the objective function of the molded product, which is not specifically limited. However, the concentration of the functional material is preferably not more than the saturated concentration, while considering the permeability into the molten resin and the aggregation of the functional material in the pressurized fluid.

The pressurized fluid may further contain a solvent. For example, it is possible to use the pressurized fluid which is obtained as an emulsified liquid (emulsion) by using water together with high pressure carbon dioxide and a water-soluble surfactant. The material, which is dissolvable in high pressure carbon dioxide, is limited. Therefore, when the solvent as described above is used, a water-soluble material can be introduced into the molten resin by utilizing the compatibility and the dispersibility with respect to the resin possessed by carbon dioxide. If only water is brought in contact and kneaded with the molten resin, it is feared that any harmful influence such as hydrolysis or the like may be caused by water remaining in the molded product. However, when water is introduced into the molten resin in a form of emulsion together with high pressure carbon dioxide, then water can be quickly separated from the molten resin together with carbon dioxide, and it is possible to avoid the harmful influence as described above. Further, when the functional material is used, the pressurized fluid may contain a solvent which dissolves the functional material. For example, when an organic metal complex is used, a fluorine-based organic solvent such as perfluoropentylamine or the like may be used in order to raise the concentration of the organic metal complex in the pressurized fluid.

The method for preparing the pressurized fluid containing high pressure carbon dioxide is not specifically limited, and it is possible to use any conventionally known method. For example, the pressurized fluid can be prepared by pressurizing liquid carbon dioxide by means of any pressurizing mechanism such as a syringe pump or the like. When the pressurized fluid containing high pressure carbon dioxide and the functional material is prepared, the pressurized fluid can be prepared by mixing and agitating high pressure carbon dioxide and the functional material. Further, when a solution, in which the functional material is dissolved in a solvent, is used, the pressurized fluid can be prepared by mixing high pressure carbon dioxide with the solution pressurized to a predetermined pressure by means of any pressurizing mechanism.

Any arbitrary method can be used as the method for introducing the pressurized fluid into the high pressure kneading zone 22. For example, the pressurized fluid may be intermittently introduced into the high pressure kneading zone 22, or the pressurized fluid may be continuously introduced. When the pressurized fluid is introduced, it is preferable that a syringe pump, which makes it possible to perform the stable liquid feeding, is utilized to control the amount of introduction. When the pressurized fluid is introduced by using the syringe pump, high pressure carbon dioxide, which is in a stable liquid state even in the case of a high density, is preferably used.

Subsequently, the separating step is performed such that the high pressure kneading zone 22 and the pressure reduction zone 23 are communicated with each other to lower the resin internal pressure of the molten resin which is brought in contact and kneaded with the pressurized fluid, and thus gasified carbon dioxide is separated from the molten resin. In this embodiment, the seal mechanism S2 is used, which makes communication between the high pressure kneading zone 22 and the pressure reduction zone 23 in accordance with the rotation state of the screw 20. Therefore, high pressure carbon dioxide contained in the pressurized fluid introduced into the molten resin can be quickly gasified without depending on the pressure of the high pressure kneading zone 22, and gasified carbon dioxide can be discharged to the outside of the plasticizing cylinder 210. The pressure of the pressure reduction zone 23 is not specifically limited, because the resin internal pressure is reduced when the pressure of the pressure reduction zone 23 is lower than the pressure of the high pressure kneading zone 22. A vacuum pump may be used in order to efficiently discharge gasified carbon dioxide.

When gasified carbon dioxide is separated from the molten resin, carbon dioxide may be separated while feeding the molten resin to the pressure reduction zone 23. Alternatively, carbon dioxide may be separated in such a state that the molten resin is allowed to stay in the high pressure kneading zone 22. That is, in the kneading apparatus 200 of this embodiment, the downstream side seal mechanism S2 is provided, which makes communication and disconnection between the high pressure kneading zone 22 and the pressure reduction zone 23 in accordance with the rotation state of the screw 20. Therefore, even when the molten resin is not fed to the pressure reduction zone 23, the resin internal pressure of the molten resin can be lowered in the state in which the molten resin is allowed to stay in the high pressure kneading zone 22 on condition that the high pressure kneading zone 22 and the pressure reduction zone 23 are communicated with each other. Part of high pressure carbon dioxide in the high pressure kneading zone 22 is gasified thereby, and gasified carbon dioxide can be discharged from the pressure reduction zone 23. For example, the following procedure is appropriately performed. That is, the screw 20 is reversely rotated to control the number of revolutions of the screw 20 in a state in which the molten resin is not fed frontwardly, the tapered surface of the truncated cone portion 51 and the tapered surface of the tapered portion 62 are separated from each other, and thus the gap G is slightly opened. Accordingly, the pressurized fluid can be brought in contact with the molten resin in the high pressure kneading zone 22 having a lowered concentration of high pressure carbon dioxide again, and the pressurized fluid can be further introduced into the molten resin. Further, when the pressure of the high pressure kneading zone 22 is higher than the resin internal pressure in the plasticizing zone 21, the upstream side seal mechanism S1 is easily moved in the direction in which the plasticizing zone 21 and the high pressure kneading zone 22 are disconnected from each other. Therefore, any new flow of the molten resin, which is directed from the plasticizing zone 21 to the high pressure kneading zone 22, is suppressed, and it is also possible to avoid the leakage of the pressurized fluid to the plasticizing zone 21. Therefore, according to the production method based on the use of the kneading apparatus 200 of this embodiment, the kneading step and the separating step can be repeatedly performed in the state in which the molten resin is allowed to stay in the high pressure kneading zone 22. Accordingly, for example, when the pressurized fluid containing the functional material is used, it is possible to obtain a thermoplastic resin molded product in which the functional material is dispersed at a high concentration even in the case of the functional material having a low solubility in high pressure carbon dioxide. In this procedure, as described above, the forward rotation and the reverse rotation of the screw 20 may be repeated bit by bit in order to repeat the communication and the disconnection between the high pressure kneading zone 22 and the pressure reduction zone 23. Alternatively, it is also allowable to repeat, bit by bit, the reverse rotation of the screw 20 at a number of revolutions of not less than a predetermined number of revolutions and the stop of the rotation of the screw 20 or the decrease in the number of revolutions of the reverse rotation of the screw 20.

When gasified carbon dioxide is separated from the molten resin, the molten resin is fed to the forward end portion of the screw 20. Further, the molding step is performed such that the molten resin, which is injected from the forward end portion of the plasticizing cylinder 210, is molded to have a desired shape. As for the molding step used in this embodiment, it is possible to use any conventionally known injection molding method and any conventionally known extrusion molding method depending on the type of the objective molded product. When the injection molding method is utilized, the thermoplastic resin molded product can be produced such that the screw 20 is moved frontwardly by means of moving mechanism connected to the back end portion of the plasticizing cylinder 210 after completing the plasticization and the weighing, and the molten resin is injected and charged into a mold having a predetermined internal shape. On the other hand, when the extrusion molding method is utilized, the molded product, which has a shape of, for example, a pellet shape, a tube shape, a sheet shape or the like, can be produced such that the molten resin is injected from the plasticizing cylinder 210 into an extrusion die having a predetermined internal shape.

The present teaching will be explained more specifically below on the basis of Examples. However, the present teaching is not limited to Examples.

EXAMPLES

Example 1

In Example 1, a thermoplastic resin molded product, in which a functional material was dispersed, was produced by means of the injection molding by using a kneading apparatus 200 provided with seal mechanisms each having the form as shown in FIG. 4 as the upstream side and downstream side seal mechanisms S1, S2. Nylon 6 (Amilan CM1011G30 produced by Toray) added with 30% by mass of glass fiber was used as the thermoplastic resin, hexafluoroacetylacetone palladium (II) as an organic metal complex was used as the functional material, and perfluoropentylamine was used as the solvent. The amount of introduction was adjusted so that the concentration of carbon dioxide was about 2% by mass and the concentration of the organic metal complex was about 100 ppm with respect to the mass of the molten resin of each one shot.

Figure 6:
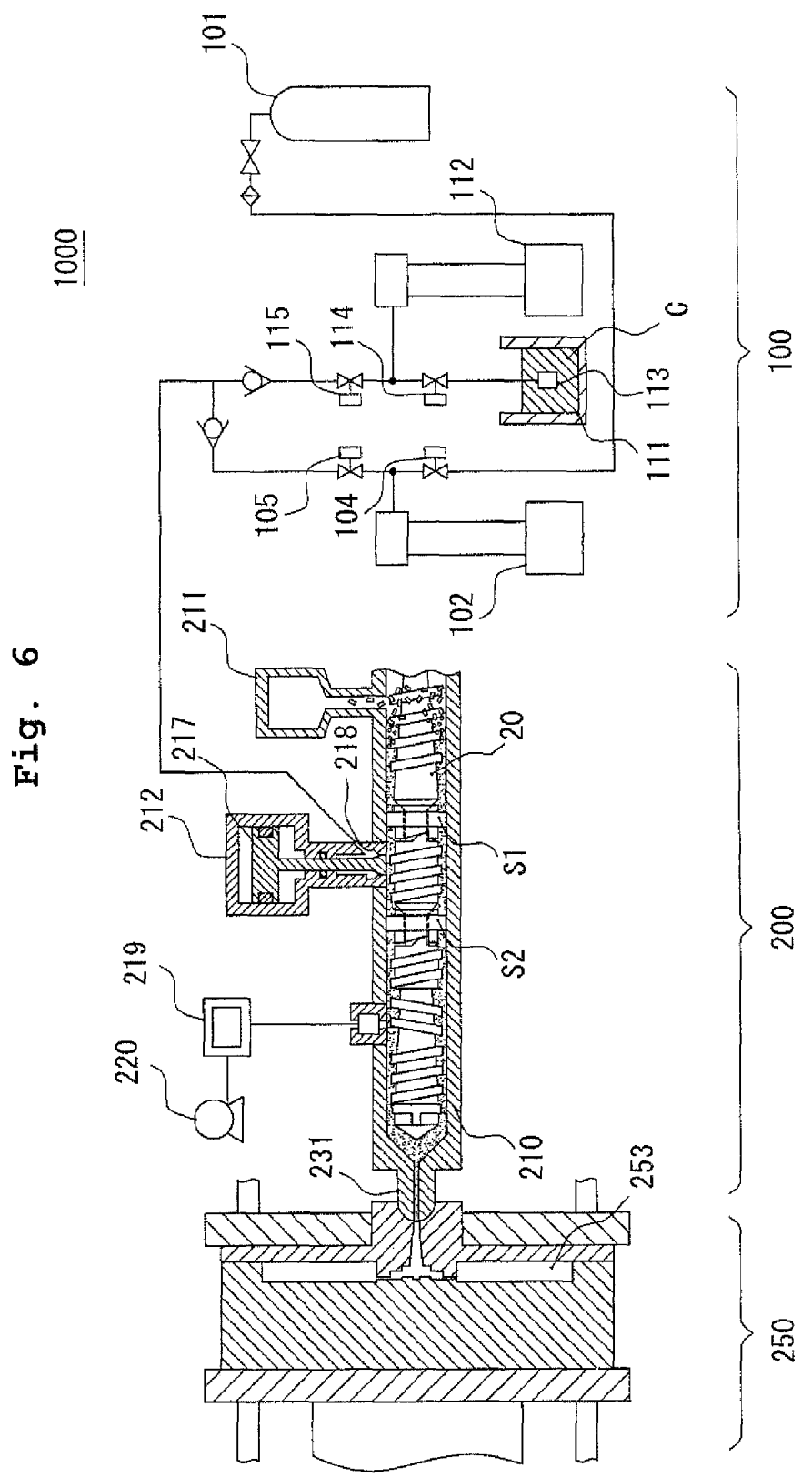
FIG. 6 shows a schematic sectional view illustrating an exemplary molding machine according to the embodiment of the present teaching.

FIG. 6 shows a schematic sectional view illustrating a molding machine used in Example 1. As shown in FIG. 6, the molding machine 1000 is provided with a pressurized fluid supply apparatus 100 for preparing the pressurized fluid by mixing high pressure carbon dioxide and a solution C containing the organic metal complex dissolved in the fluorine-based solvent and supplying the prepared pressurized fluid to a plasticizing cylinder 210, the kneading apparatus 200 as described above, and an injection molding apparatus 250 having a mold. The pressurized fluid supply apparatus 100, the kneading apparatus 200, and the injection molding apparatus 250 are subjected to the operation control by an unillustrated control unit.

The pressurized fluid supply apparatus 100 is provided with a liquid carbon dioxide bomb 101, a syringe pump 102 for carbon dioxide for pressurizing liquid carbon dioxide at a predetermined pressure to supply high pressure carbon dioxide, a solution tank 111 for preparing the solution C containing the organic metal complex dissolved in the solvent, and a syringe pump 112 for the solution for pressuring the solution C at a predetermined pressure to feed the solution C. An air operate valve for suction 104 and an air operate valve for supply 105 are arranged for each of a piping for connecting the liquid carbon dioxide bomb 101 and the syringe pump 102 for carbon dioxide and a piping for connecting the syringe pump 102 for carbon dioxide and the plasticizing cylinder 210. Further, an air operate valve for suction 114 and an air operate valve for supply 115 are arranged for each of a piping for connecting the solution tank 111 and the syringe pump 112 for the solution and a piping for connecting the syringe pump 112 for the solution and the plasticizing cylinder 210.

When the pressurized fluid is prepared, then the air operate valve for suction 104 is firstly opened, and liquid carbon dioxide is sucked from the liquid carbon dioxide bomb 101. Subsequently, liquid carbon dioxide is pressurized to arrive at a predetermined pressure in accordance with the pressure control of the syringe pump 102 for carbon dioxide. In Example 1, high pressure carbon dioxide having a pressure of 10 MPa and a temperature of 10° C. was supplied.

On the other hand, the air operate valve for suction 114, which is disposed on the syringe pump 112 for the solution, is opened to suck the solution C containing the organic metal complex dissolved in the solvent from the solution tank 111 via a filter 113 at ordinary temperature, and the solution C is pressurized to arrive at a predetermined pressure in accordance with the pressure control of the syringe pump 112 for the solution. In Example 1, the solution C was pressurized to 10 MPa.

Subsequently, the air operate valves for supply 105, 115 are opened, and then the syringe pump 102 for carbon dioxide and the syringe pump 112 for the solution are switched from the pressure control to the flow rate control. High pressure carbon dioxide and the pressurized solution C are allowed to flow so as to provide a predetermined flow rate ratio. Accordingly, high pressure carbon dioxide and the solution C are mixed in the piping. In Example 1, the supply volume ratio between high pressure carbon dioxide and the solution C was set to 5:1. When the pressurized fluid, in which the volume ratio between high pressure carbon dioxide and the solution C is within a certain range (1:1 to 10:1), is used, then the thermal decomposition of the organic metal complex can be avoided by high pressure carbon dioxide in the kneading step, and high pressure carbon dioxide can be allowed to function as the compatibility-providing agent to assist the dispersion of the organic metal complex in the molten resin.

On the other hand, the thermoplastic resin, which is supplied from the resin supplying hipper 211 of the kneading apparatus 200, is kneaded and melted by forwardly rotating the screw 20 while heating the plasticizing cylinder 210 by means of the band heater (not shown) provided on the outer wall surface of the plasticizing cylinder 210. In Example 1, the plasticizing cylinder 210 was heated so that the resin temperature was 210 to 240° C.

When the molten resin was fed to the high pressure kneading zone 22, then the rotation of the screw 20 was once stopped at a position before arrival at the plasticization and weighing completion position by 20 mm (position on the mold side) in order to disconnect the high pressure kneading zone 22 from the pressure reduction zone 23 and the plasticizing zone 21, and then the screw 20 was reversely rotated (number of revolutions: 50 rpm). Accordingly, the upstream side and downstream side seal rings 40, 60 were moved to the upstream side, and the tapered surfaces of the truncated cone portions 31, 51 were allowed to abut against the tapered surfaces of the tapered portions 42, 62. Further, the upstream side and downstream side seal rings 40, 60 were allowed to corotate together with the screw 20. Thus, the gaps G were closed between the inner circumferential surfaces of the upstream side and downstream side seal rings 40, 60 and the outer circumferential surfaces of the screw 20, and the high pressure kneading zone 22 was disconnected from the pressure reduction zone 23 and the plasticizing zone 21.

As shown in FIG. 6, the introducing valve 212 is provided at the introducing port 202 of the plasticizing cylinder 210 in order to introduce the pressurized fluid. The introducing valve 212 has a fluid supply port 218 which is disposed at the proximal end portion connected to the introducing port 202 of the plasticizing cylinder 210, and the introducing valve 212 has an introducing piston 217 which is disposed therein. Therefore, when the fluid supply port 218 is opened by the introducing piston 217, the pressurized fluid is thereby introduced from the pressurized fluid supply apparatus 100 into the plasticizing cylinder 210. In Example 1, the pressurized fluid was intermittently introduced for every shot in accordance with the flow rate control so that the pressurized fluid was allowed to stay in the high pressure kneading zone 22 for 1 second after sealing the high pressure kneading zone 22 by means of the upstream side and downstream side seal mechanisms S1, S2, and thus the molten resin and the pressurized fluid were brought in contact and kneaded with each other. The resin internal pressure before the introduction of the pressurized fluid was 0.1 MPa, and the resin internal pressure during the contact and kneading after the introduction of the pressurized fluid was 1 to 8 MPa. When the molding was performed under the same plasticization and weighing condition by using a conventional kneading apparatus in which a poppet valve openable/closable in accordance with the spring pressure was provided in a screw, then the resin internal pressure before the introduction of the pressurized fluid was 8 MPa, and the resin internal pressure during the contact and kneading was 13 to 14 MPa. Therefore, it has been confirmed that the kneading apparatus of Example 1 can perform the plasticization and weighing for the molten resin at the pressure lower than that of the kneading apparatus having the conventional seal mechanism and the kneading apparatus of Example 1 has the high plasticizing ability.

The vent port 203 of the plasticizing cylinder 210 is connected by a discharge tube to the vacuum pump 220 via the buffer container 219. Therefore, when the high pressure kneading zone 22 and the pressure reduction zone 23 are communicated with each other, and the vacuum pump 220 is operated, then the pressure is reduced at the inside of the plasticizing cylinder 210. In Example 1, the pressurized fluid was allowed to stay in the high pressure kneading zone 22, and then the number of revolutions of the reverse rotation of the screw 20 was lowered (number of revolutions: 30 rpm) so that the upstream side and downstream side seal rings 40, 60 were returned to the original downstream side positions. The tapered surfaces of the truncated cone portions 31, 51 and the tapered surfaces of the tapered portions 42, 62 were separated from each other, and the gaps G were opened between the inner circumferential surfaces of the upstream side and downstream side seal rings 40, 60 and the outer circumferential surfaces of the screw 20 so that gasified carbon dioxide was discharged from the vent port 203. In this procedure, any vent-up of the resin was not caused from the vent port 203.

Subsequently, the screw 20 was returned to the forward rotation, and the molten resin was fed to the forward end portion of the screw 20 to complete the plasticization and weighing so that the molten resin was injected and charged into the cavity 253. The obtained molded product was colored to be brown. Therefore, it was confirmed that the organic metal complex was introduced into the molten resin. In order to confirm the satisfactory dispersion of the organic metal complex in the molded product, a plating process was performed for the obtained molded product. In the plating process, in order to firstly swell the surface of the molded product, the molded product was immersed for 5 minutes in an aqueous solution containing 1,3-butanediol by 50% by volume at 80° C. Subsequently, a general purpose NiP electroless plating process was applied to the molded product to form a metal film on the entire surface. Further, a copper electroplating film of 20 µm, a nickel electroplating film of 10 µm, and a chromium electroplating film of 0.5 µm were continuously formed on the metal film in this order. The obtained plated product was subjected to a heat shock test in which a cycle including retaining the plated product at 120° C. for 1 hour and then retaining the plated product at −40° C. for 1 hour was repeated 100 times (cycles). After the test, the appearance was inspected visually. As a result, neither blister nor crack appeared on the plating film. It was confirmed that the plating film, which was excellent in the tight contact performance, was formed.

When the molding as described above was repeated, and the resin internal pressure in the high pressure kneading zone 22, which was provided upon the contact and kneading in the 1000th shot, was measured, then the resin internal pressure was 1 to 8 MPa, and the pressure was the same as the pressure in the 1st shot. Therefore, it has been confirmed that the thermoplastic resin molded product can be produced stably for a long period of time in accordance with Example 1.

Example 2

In Example 2, a thermoplastic resin molded product, in which a functional material was dispersed, was produced by means of the injection molding by using the kneading apparatus 200 and the molding machine 1000 which were the same as or equivalent to those used in Example 1. Amorphous Nylon (Grivory TR55 produced by EMS-CHEMIE (Japan) Ltd.) was used as the thermoplastic resin, silver salt (I) of heptafluorobutyric acid as an antibacterial agent was used as the functional material, and ethanol was used as the solvent. The amount of introduction was adjusted so that the concentration of carbon dioxide was about 6% by mass and the concentration of the antibacterial agent was 400 ppm with respect to the mass of the molten resin for each one shot.

At first, the pressurized fluid was prepared by using the pressurized fluid supply apparatus 100, and the thermoplastic resin was melted by using the kneading apparatus 200 in the same manner as in Example 1. When the molten resin was fed to the high pressure kneading zone 22, then the screw 20 was once stopped, and then the screw 20 was reversely rotated (number of revolutions: 50 rpm) in the same manner as in Example 1. The upstream side and downstream side seal rings 40, 60 were moved to the upstream side, and the tapered surfaces of the truncated cone portions 31, 51 were allowed to abut against the tapered surfaces of the tapered portions 42, 62 so that the high pressure kneading zone 22 was disconnected from the pressure reduction zone 23 and the plasticizing zone 21.

Subsequently, in Example 2, the number of revolutions of the reverse rotation of the screw 20 was lowered (number of revolutions: 20 rpm) while continuously introducing the pressurized fluid in accordance with the flow rate control, and the upstream side and downstream side seal rings 40, 60 were slightly moved to the downstream side. Thus, the tapered surfaces of the truncated cone portions 31, 51 and the tapered surfaces of the tapered portions 42, 62 were separated from each other. Accordingly, the gaps G were slightly opened between the inner circumferential surfaces of the upstream side and downstream side seal rings 40, 60 and the outer circumferential surfaces of the screw 20, and gasified carbon dioxide was discharged. Further, the number of revolutions of the reverse rotation of the screw 20 was changed bit by bit (number of revolutions: 20 to 50 rpm), and thus the communication and the disconnection were repeated between the high pressure kneading zone 22 and the pressure reduction zone 23. In this procedure, the resin internal pressure was varied within a range of 5 to 10 MPa in the high pressure kneading zone 22. Any vent-up of the resin was not caused from the vent port 203.

Subsequently, the screw 20 was returned to the forward rotation, and the molten resin was fed to the forward end portion of the screw 20 in the same manner as in Example 1 to complete the plasticizing and weighing so that the molten resin was injected and charged into the cavity 253. The obtained molded product was used to evaluate the antibacterial performance in accordance with a standardized test method (JIS Z 2911) by using *Staphylococcus aureus* and *Escherichia coli*. As a result, it was confirmed that the molded product had a high antibacterial function and the antibacterial agent was satisfactorily dispersed in the molded product. Therefore, according to Example 2, the molten resin and the pressurized fluid can be repeatedly brought in contact and kneaded with each other while suppressing any excessive increase in the resin internal pressure in the high pressure kneading zone 22. Further, part of high pressure carbon dioxide is gasified in the high pressure kneading zone 22 by making communication between the high pressure kneading zone 22 and the pressure reduction zone 23 even in such a state that the supply of the molten resin from the upstream side to the high pressure kneading zone 22 is suppressed, wherein gasified carbon dioxide can be discharged from the pressure reduction zone 23. Accordingly, when the pressurized fluid containing high pressure carbon dioxide and the functional material is used, the functional material, which is insoluble in high pressure carbon dioxide due to the pressure reduction, can be progressively allowed to remain at the inside of the molten resin in the high pressure kneading zone 22 in the vicinity of the pressure reduction zone 23. Therefore, the functional material can be introduced into the molten resin at a high concentration by repeatedly performing the contact and kneading of the molten resin and the pressurized fluid.

When the molding as described above was repeated, and the resin internal pressure in the high pressure kneading zone 22, which was provided upon the contact and kneading in the 1000th shot, was measured, then the resin internal pressure was 5 to 10 MPa, and the pressure was the same as the pressure in the 1st shot. Therefore, it has been confirmed that the thermoplastic resin molded product can be produced stably for a long period of time in accordance with Example 2.

Example 3

In Example 3, a thermoplastic resin molded product, in which a functional material was dispersed, was produced by means of the injection molding by using a kneading apparatus 200 provided with seal mechanisms each having the form as shown in FIG. 5 as the upstream side and downstream side seal mechanisms S1, S2 and the molding machine 1000 shown in FIG. 6. The thermoplastic resin, the functional material, and the solvent, which were the same as or equivalent to those used in Example 1, were used. The amounts of introduction of carbon dioxide and the functional material were adjusted in the same manner as in Example 1.

At first, the pressurized fluid was prepared by using the pressurized fluid supply apparatus 100, and the thermoplastic resin was melted by using the kneading apparatus 200 in the same manner as in Example 1. When the molten resin was fed to the high pressure kneading zone 22, then the rotation of the screw 20 was once stopped, and then the screw 20 was reversely rotated so that the upstream side and downstream side seal rings 40, 60 were moved to the upstream side. Accordingly, the tapered surfaces of the truncated cone portions 31, 51 were allowed to abut against the tapered surfaces of the tapered portions 42, 62, and the high pressure kneading zone 22 was disconnected from the pressure reduction zone 23 and the plasticizing zone 21.

Subsequently, in Example 3, the pressurized fluid was intermittently introduced in accordance with the flow rate control so that the pressurized fluid was allowed to stay for 1 second in the high pressure kneading zone 22. The molten resin and the pressurized fluid were brought in contact and kneaded with each other, and then the screw 20 was returned to the forward rotation. The upstream side and downstream side seal rings 40, 60 were moved to the downstream side, and thus the tapered surfaces of the truncated cone portions 31, 51 were separated from the tapered surfaces of the tapered portions 42, 62 so that the gaps G were opened between the inner circumferential surfaces of the upstream side and downstream side seal rings 40, 60 and the outer circumferential surfaces of the screw 20. The resin internal pressure during the contact and kneading was 1 to 8 MPa. Gasified carbon dioxide was discharged while feeding the molten resin to the pressure reduction zone 23, and then the plasticizing and weighing were completed in the same manner as in Example 1 so that the molten resin was injected and charged into the cavity 253. A plating product was manufactured by using the obtained molded product in the same manner as in Example 1. As a result, it was confirmed that a plating film, which was excellent in the tight contact performance, was formed.

When the molding as described above was repeated, and the resin internal pressure in the high pressure kneading zone 22, which was provided upon the contact and kneading in the 1000th shot, was measured, then the resin internal pressure was 1 to 8 MPa, and the pressure was the same as the pressure in the 1st shot. Therefore, it has been confirmed that the thermoplastic resin molded product can be produced stably for a long period of time in accordance with Example 3.

The present teaching has been explained in detail above. The present teaching is summarized as follows according to the embodiments described above.

In one aspect, the present teaching resides in a kneading apparatus including a plasticizing cylinder and a screw which is arranged rotatably and movably back and forth in the plasticizing cylinder, wherein a high pressure kneading zone and a pressure reduction zone are formed adjacently in this order from an upstream side in the plasticizing cylinder so that a molten resin obtained by plasticizing a thermoplastic resin and a pressurized fluid containing high pressure carbon dioxide are brought in contact and kneaded with each other in the high pressure kneading zone, and gasified carbon dioxide, which is gasified by reducing a resin internal pressure, is separated in the pressure reduction zone from the molten resin brought in contact and kneaded with the pressurized fluid, the kneading apparatus further including:

a downstream side seal mechanism which is provided between the high pressure kneading zone and the pressure reduction zone and which makes communication and disconnection between the high pressure kneading zone and the pressure reduction zone in accordance with a rotation state of the screw.

According to the kneading apparatus as described above, the downstream side seal mechanism, which makes communication and disconnection between the high pressure kneading zone and the pressure reduction zone in accordance with the rotation state of the screw, is provided between the high pressure kneading zone and the pressure reduction zone. Any reaction force is not generated by any spring between the high pressure kneading zone and the pressure reduction zone. Therefore, it is possible to obtain the high plasticizing ability.

Further, the downstream side seal mechanism makes communication and disconnection between the high pressure kneading zone and the pressure reduction zone in accordance with the rotation state of the screw, and hence the sealing performance is not deteriorated even when the apparatus is used for a long period of time.

It is also preferable that the downstream side seal mechanism disconnects the high pressure kneading zone from the pressure reduction zone in accordance with reverse rotation of the screw. It is also preferable that the downstream side seal mechanism makes communication between the high pressure kneading zone and the pressure reduction zone in accordance with any one of forward rotation of the screw, stop of rotation of the screw, and decrease in a number of revolutions of reverse rotation of the screw.

According to the kneading apparatus as described above, the high pressure kneading zone and the pressure reduction zone can be communicated with each other and disconnected from each other at any desired timing in accordance with the rotation state of the screw.

Preferably, in the kneading apparatus as described above;
the downstream side seal mechanism is provided with a reduced diameter portion of the screw which is arranged between the high pressure kneading zone and the pressure reduction zone and which has a seal portion, and a seal ring which is externally fitted to the reduced diameter portion of the screw movably in an axial direction and which has a contact surface to abut against the seal portion; and
the high pressure kneading zone and the pressure reduction zone are communicated with each other when the seal portion of the reduced diameter portion and the contact surface of the seal ring are separated from each other in one rotation state of the screw, while the high pressure kneading zone and the pressure reduction zone are disconnected from each other when the seal portion of the reduced diameter portion abuts against the contact surface of the seal ring in the other rotation state of the screw.

According to the kneading apparatus as described above, the seal portion of the reduced diameter portion of the screw and the contact surface of the seal ring make separation and abutment in accordance with the rotation state of the screw, and thus it is possible to communicate and disconnect the high pressure kneading zone and the pressure reduction zone.

Preferably, in the kneading apparatus as described above;
the screw is provided with a fastening portion and the seal ring is provided with a fastening objective portion which is engageable and disengageable with respect to the fastening portion of the screw; and
the fastening portion of the screw and the fastening objective portion of the seal ring are engaged with each other when the screw is reversely rotated at a number of revolutions which is not less than a predetermined number of revolutions so that the screw and the seal ring corotate and thus an abutment state is maintained between the seal portion of the reduced diameter portion and the contact surface of the seal ring.

According to the kneading apparatus as described above, the seal ring and the screw corotate in the engaged state during the period in which the screw is reversely rotated at the number of revolutions which is not less than the predetermined number of revolutions. Therefore, it is possible to reliably disconnect the high pressure kneading zone from the pressure reduction zone. Further, it is possible to communicate and disconnect the high pressure kneading zone and the pressure reduction zone in accordance with the number of revolutions of the screw.

When a plasticizing zone, in which the thermoplastic resin is plasticized to provide the molten resin, is formed adjacently on an upstream side of the high pressure kneading zone in the plasticizing cylinder; then
the kneading apparatus as described above preferably includes an upstream side seal mechanism which is provided between the plasticizing zone and the high pressure kneading zone and which makes communication and disconnection between the plasticizing zone and the high pressure kneading zone in accordance with the rotation state of the screw.

According to the kneading apparatus as described above, the upstream side seal mechanism, which makes communication and disconnection between the plasticizing zone and the high pressure kneading zone, is also provided on the upstream side of the high pressure kneading zone. Therefore, the sealing performance can be further enhanced for the high pressure kneading zone.

In another aspect, the present teaching resides in a method for producing a thermoplastic resin molded product by using the kneading apparatus as defined above, the method including:
a kneading step of disconnecting the high pressure kneading zone and the pressure reduction zone from each other by means of the downstream side seal mechanism so that the molten resin and the pressurized fluid are brought in contact and kneaded with each other at a high pressure; and
a separating step of making communication between the high pressure kneading zone and the pressure reduction zone by means of the downstream side seal mechanism to lower a resin internal pressure of the molten resin brought in contact and kneaded with the pressurized fluid so that gasified carbon dioxide is separated from the molten resin brought in contact and kneaded with the pressurized fluid.

According to the production method as described above, the molten resin and the pressurized fluid can be brought in contact with and kneaded with each other in such a state that the high sealing performance is secured in the high pressure kneading zone in the kneading step. Further, in the separating step, the resin internal pressure can be quickly lowered, and gasified carbon dioxide can be smoothly separated from the molten resin so that gasified carbon dioxide can be discharged.

Preferably, in the method for producing the thermoplastic resin molded product as described above, the kneading step and the separating step may be repeated a plurality of times in a state in which the molten resin is allowed to stay in the high pressure kneading zone.

According to the production method as described above, the molten resin having the concentration of high pressure carbon dioxide lowered by the separating step and the pressurized fluid can be repeatedly brought in contact and kneaded with each other. Therefore, even when the solubility of high pressure carbon dioxide with respect to the molten resin is low, a large amount of high pressure carbon dioxide can be introduced into the molten resin. When the pressurized fluid containing a functional material is used, a large amount of the functional material can be introduced into the molten resin.

In the production method as described above, the pressurized fluid may contain a functional material. According to the production method as described above, it is possible to produce the thermoplastic resin molded product in which the functional material is satisfactorily dispersed.

As described above, according to the present teaching, it is possible to provide the kneading apparatus and the method for producing the thermoplastic resin molded product, wherein when the pressurized fluid containing high pressure carbon dioxide is introduced into the plasticizing cylinder, and the pressurized fluid and the molten resin obtained by plasticizing the thermoplastic resin are brought in contact and kneaded with each other in the plasticizing cylinder to produce the thermoplastic resin molded product, then the high plasticizing ability is obtained, and the thermoplastic resin molded product can be produced stably for a long period of time.

The present teaching has been explained above with reference to the embodiments and Examples. However, the present teaching is not limited to the embodiments and Examples described above. The construction and details of the present teaching can be variously changed as understood by those skilled in the art within a scope of the present teaching.

According to the present teaching, when the thermoplastic resin molded product is produced by using the pressurized fluid containing high pressure carbon dioxide, it is possible to stably maintain the high pressure state for a long period of time for the high pressure kneading zone in which the molten resin and the pressurized fluid are brought in contact and kneaded with each other. Therefore, according to the present teaching, it is possible to industrially and stably produce various thermoplastic resin molded products including, for example, a molded product which is modified in quality by using high pressure carbon dioxide, a molded product in which any remaining solvent is decreased, a molded product which is formed as an alloy, and a molded product in which any functional material is dispersed.

The invention claimed is:

1. A kneading apparatus comprising:
    a plasticizing cylinder in which a high pressure kneading zone and a pressure reduction zone are formed adjacently in this order from an upstream side so that a molten resin obtained by plasticizing a thermoplastic resin and a pressurized fluid are kneaded with each other in the high pressure kneading zone, and gasified pressurized fluid, which is gasified by reducing a resin internal pressure, is separated in the pressure reduction zone from the molten resin kneaded with the pressurized fluid,
    a screw that rotates forwardly and reversely and that moves back and forth in the plasticizing cylinder; and
    a downstream side seal mechanism that is provided between the high pressure kneading zone and the pressure reduction zone and that makes communication and disconnection of the pressurized fluid and the molten resin between the high pressure kneading zone and the pressure reduction zone in accordance with a rotation state of the screw, wherein
        the downstream side seal mechanism is provided with a reduced diameter portion of the screw that is arranged between the high pressure kneading zone and the pressure reduction zone and that has a seal portion, and a seal ring that is externally fitted to the reduced diameter portion of the screw movably in an axial direction and that has a contact surface to abut against the seal portion; and
        the high pressure kneading zone and pressure reduction zone are communicated with each other when the seal portion of the reduced diameter portion and the contact surface of the seal ring are separated from each other in one rotation state of the screw, while the high pressure kneading zone and the pressure reduction zone are disconnected from each other when the seal portion of the reduced diameter portion abuts against the contact surface of the seal ring in the other rotation state of the screw.

2. The kneading apparatus according to claim 1, wherein the downstream side seal mechanism disconnects the high pressure kneading zone from the pressure reduction zone in accordance with reverse rotation of the screw.

3. The kneading apparatus according to claim 1, wherein the downstream side seal mechanism makes communication between the high pressure kneading zone and the pressure reduction zone in accordance with any one of forward rotation of the screw, stop of rotation of the screw, and decrease in a number of revolutions of reverse rotation of the screw.

4. The kneading apparatus according to claim 1, wherein:
    the screw is provided with a fastening portion and the seal ring is provided with a fastening objective portion that is engageable and disengageable with respect to the fastening portion of the screw; and
    the fastening portion of the screw and the fastening objective portion of the seal ring are engaged with each other when the screw is reversely rotated at a number of revolutions that is not less than a predetermined number of revolutions so that the screw and the seal ring corotate and thus an abutment state is maintained between the seal portion of the reduced diameter portion and the contact surface of the seal ring.

5. The kneading apparatus according to claim 1, wherein:
    a plasticizing zone, in which the thermoplastic resin is plasticized to provide the molten resin, is formed adjacently on an upstream side of the high pressure kneading zone in the plasticizing cylinder; and
    the kneading apparatus further comprises an upstream side seal mechanism, which makes communication and disconnection between the plasticizing zone and the high pressure kneading zone in accordance with the rotation state of the screw, between the plasticizing zone and the high pressure kneading zone.

6. The kneading apparatus according to claim 1, wherein the pressurized fluid contains high pressure carbon dioxide.

7. A method for producing a thermoplastic resin molded product by using the kneading apparatus as defined in claim 1, the method comprising:
    kneading the molten resin and the pressurized fluid with each other at a high pressure when disconnecting the high pressure kneading zone and the pressure reduction zone from each other by the downstream side seal mechanism; and
    separating the gasified pressurized fluid from the molten resin kneaded with the pressurized fluid when making communication between the high pressure kneading zone and the pressure reduction zone by the downstream side seal mechanism to lower a resin internal pressure of the molten resin kneaded with the pressurized fluid.

8. The method for producing the thermoplastic resin molded product according to claim 7, wherein the kneading and the separating are repeated a plurality of times in a state in which the molten resin is allowed to stay in the high pressure kneading zone.

9. The method for producing the thermoplastic resin molded product according to claim 7, wherein the pressurized fluid contains a functional material.

* * * * *